(12) United States Patent
Drago et al.

(10) Patent No.: US 8,083,052 B2
(45) Date of Patent: Dec. 27, 2011

(54) V-SLAT RECIPROCATING SLAT CONVEYORS

(75) Inventors: James Prentice Drago, Metolius, OR (US); John Thomas, Madras, OR (US)

(73) Assignee: Keith Mfg. Co., Madras, OR (US)

( * ) Notice: Subject to any disclaimer, the term of this patent is extended or adjusted under 35 U.S.C. 154(b) by 604 days.

(21) Appl. No.: 12/221,127

(22) Filed: Jul. 30, 2008

(65) Prior Publication Data

US 2010/0025196 A1 Feb. 4, 2010

(51) Int. Cl.
*B65G 25/04* (2006.01)
(52) U.S. Cl. .............. 198/750.4; 198/750.2; 198/750.3; 198/750.5
(58) Field of Classification Search .............. None
See application file for complete search history.

(56) References Cited

U.S. PATENT DOCUMENTS

| 4,856,645 A * | 8/1989 | Hallstrom, Jr. ............ 198/750.4 |
| 4,966,275 A * | 10/1990 | Hallstrom, Jr. ............ 198/750.6 |
| 6,782,994 B1 * | 8/2004 | Foster ........................ 198/750.2 |
| 2008/0023300 A1 * | 1/2008 | Foster ........................ 198/750.3 |

* cited by examiner

*Primary Examiner* — Gene Crawford
*Assistant Examiner* — Yolanda Cumbess
(74) *Attorney, Agent, or Firm* — Bruce A. Kaser

(57) ABSTRACT

Movable conveyor slats (12) have side parts (42, 44) which rest on top parts (32) of bearings (30). The bearings (30) have a generally U-shaped cross section and they fit on wings (16, 18) which extend outwardly and slope upwardly from the sides of a fixed conveyor slat (10). The movable slats (12) have web (48, 50) and lower flange portions (52, 54) which with the side parts (42, 44) form laterally outwardly opening channels. The wings (16, 18) and the bearings (30) are received within the channels (56, 58).

10 Claims, 9 Drawing Sheets

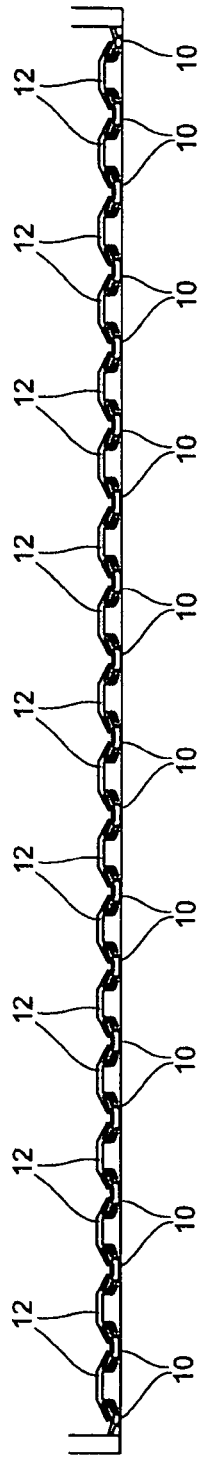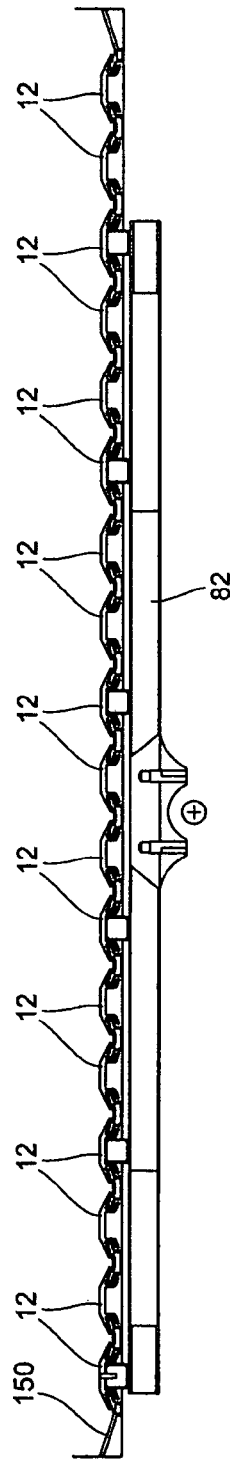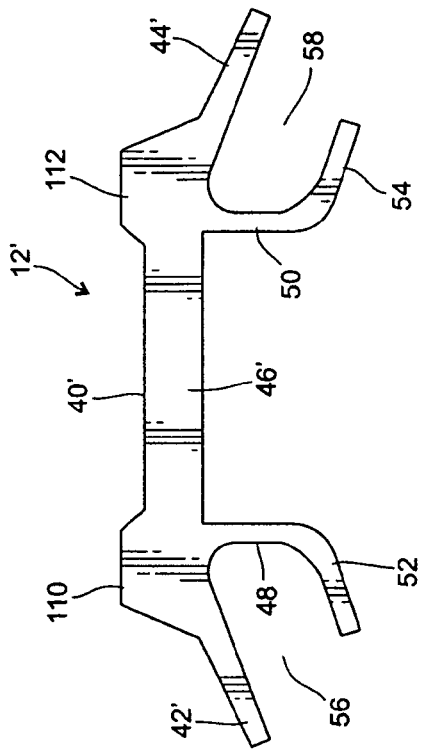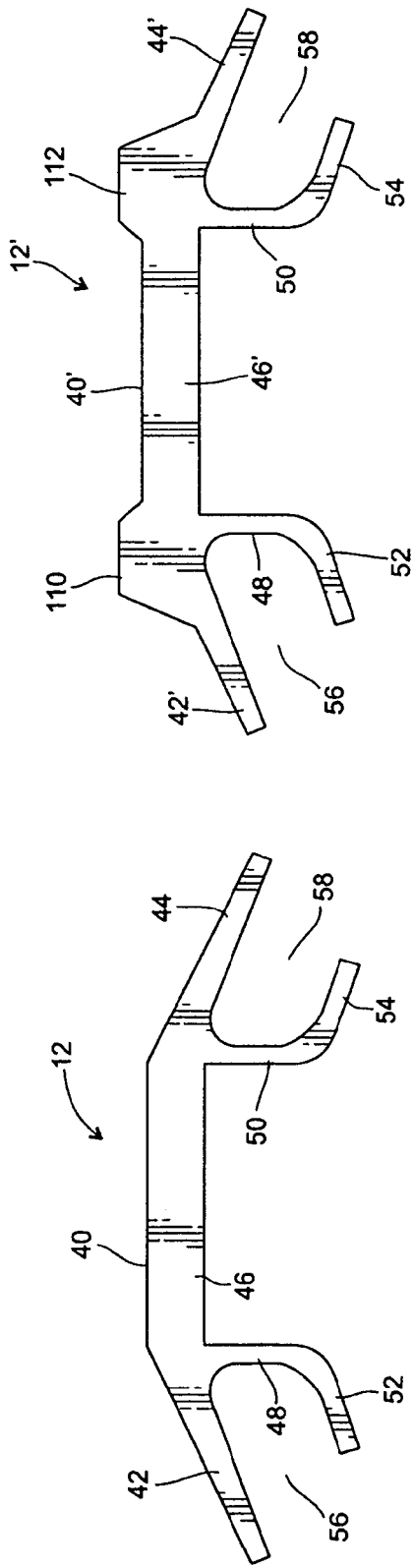

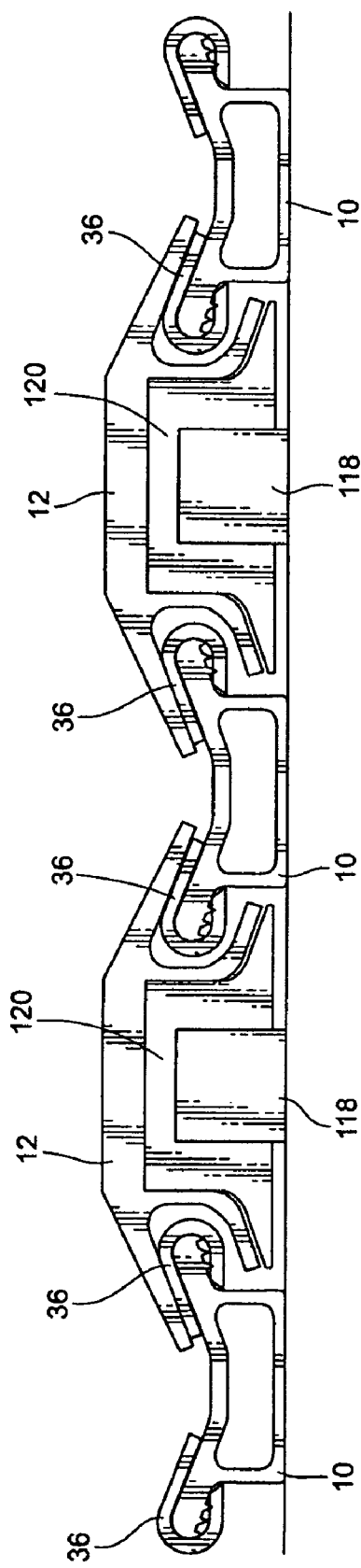
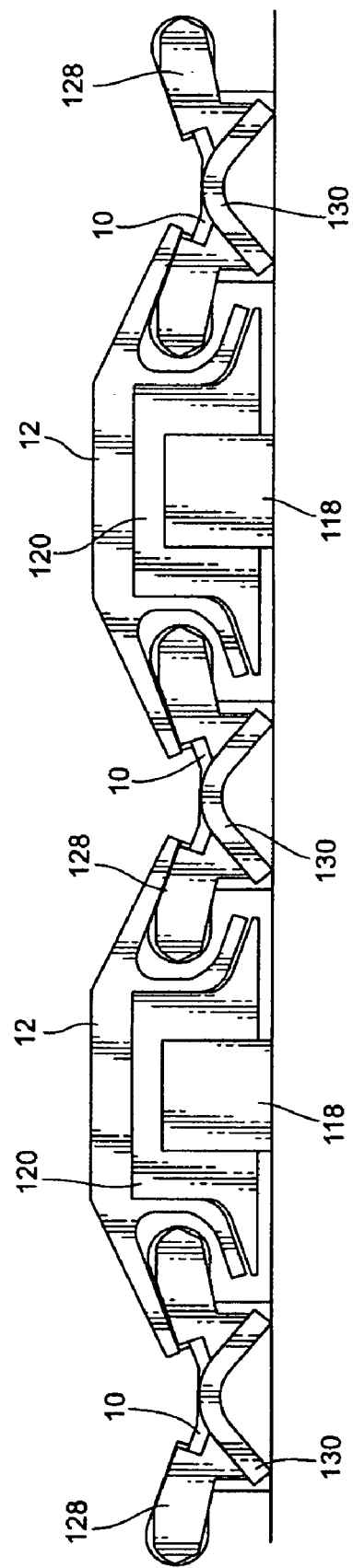
Fig. 7
Fig. 8

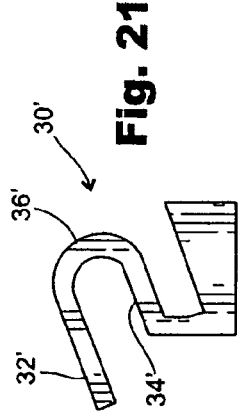
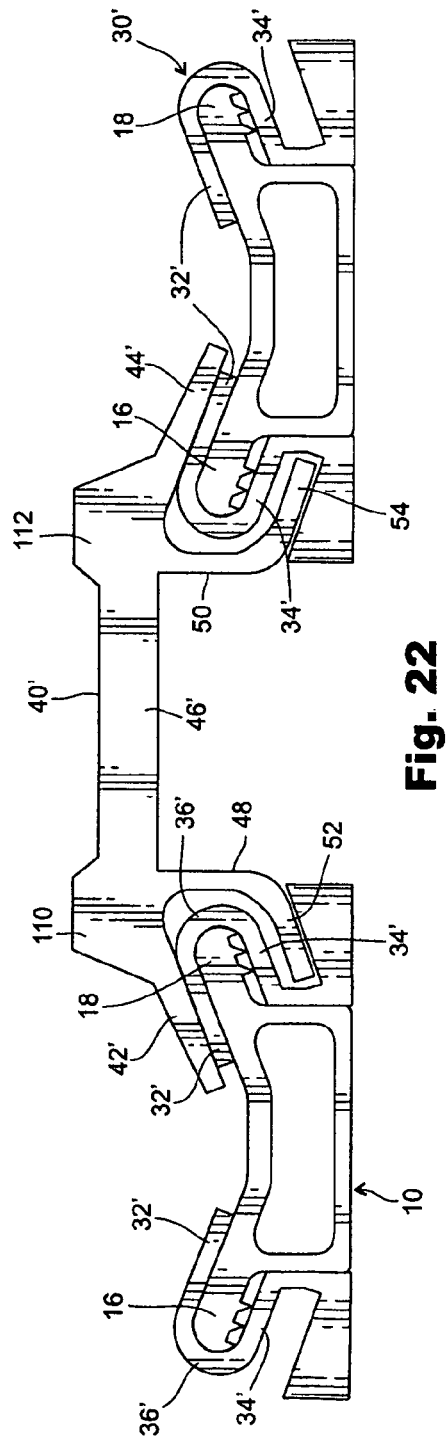
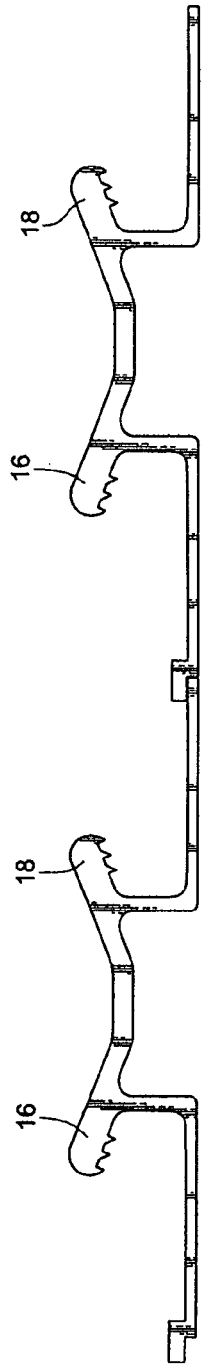

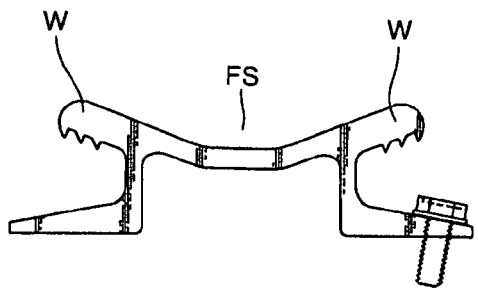
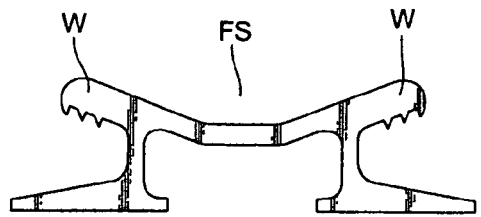
Fig. 24          Fig. 25
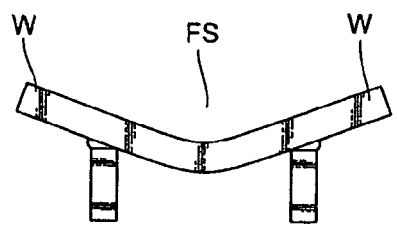
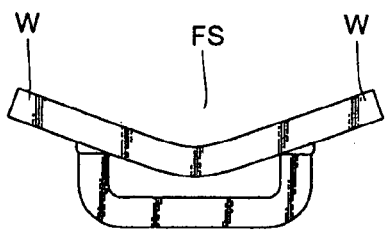
Fig. 26          Fig. 27
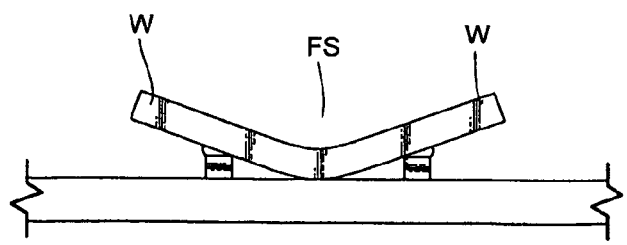
Fig. 28

V-SLAT RECIPROCATING SLAT CONVEYORS

TECHNICAL FIELD

The present invention relates to reciprocating slat conveyors. More particularly, it relates to reciprocating slat conveyors composed of laterally spaced apart, fixed slats, and laterally spaced apart, moveable slats, between the fixed slats, and to an integration of the fixed and movable slats substantially through out their lengths.

BACKGROUND OF THE INVENTION

The present invention is an improvement to the conveyor disclosed by U.S. Pat. No. 5,044,870, granted Sep. 3, 1991, to Raymond K Foster, and to the conveyor disclosed by U.S. Pat. No. 6,848,569, granted Feb. 1, 2005 to Raymond Keith Foster. The contents of these patents and the patents to which they refer are hereby incorporated herein by this specific reference. Some features of the invention are the same as or similar to features disclosed in co-pending application Ser. No. 12/221,295 filed Aug. 1, 2008, and entitled Reciprocating Slat Conveyor with Moving Slats Between Fixed Slats ("EP").

BRIEF SUMMARY OF THE INVENTION

The reciprocating slat conveyor of the present invention comprises a pair of laterally spaced apart, longitudinally extending, side beams. A forward frame section is composed of forward portions of the side beams and longitudinally spaced apart lateral frame members extending between the forward portions of the side beams. The conveyor also includes a rearward frame section comprising rearward portions of the longitudinal side beams and longitudinally spaced lateral frame beams extending between the rearward portions of the side beams. A window is defined longitudinally between the forward frame section and the rearward frame section. The window provides a space laterally between intermediate portions of the side beams and longitudinally between two longitudinally spaced apart lateral frame beams. A plurality of drive units are provided. They include fixed portions connected to the frame and movable portions in the window which are moveable, longitudinally of the conveyor. A like number of transverse drive beams are positioned in the window. Each drive beam is connected to the movable portion of a related one of the drive units. A plurality of laterally spaced apart longitudinally extending, fixed slats are connected to the front and rear sections of the frame. The fixed slats bridge longitudinally over the window and over the transverse drive beams in the window. A plurality of laterally spaced apart, longitudinally extending, moveable conveyor slats are positioned between the fixed slats. The movable slats are divided into sets equal number to the number of transverse drive beams. Each set of movable slats is connected to a separate related one of the transverse drive beams.

The present invention further comprises the improvement of said fixed slats each having a longitudinally extending center portion and a pair of side wings extending laterally outwardly and sloping upwardly from the center portion. Each movable slat has a longitudinally extending center portion, a pair of longitudinally extending side portions, and a pair of laterally spaced apart, longitudinally extending hook portions. Each hook portion includes a web connected to its movable slat where the center portion meets a side portion. The web of each hook portion extends downwardly and meets and becomes an outwardly directed lower flange. The side portions of the top, the webs, and the lower flanges together form laterally outwardly opening channel spaces. Fixed bearings are provided on the side wings. Each bearing has an upper part sitting down on its side wing and a lower part below its side wing. The side wings, and the bearings mounted on them are located in the channels of the movable slats, vertically below the side portions of the slats and vertically above the lower flanges of the slats. The side portions of the movable slats have bottom surfaces that rest on the upper parts of the bearings. The lower flanges of the slats are positioned below the lower parts of the bearings.

Preferably, the fixed and movable slats have uniform cross sectional shapes throughout their lengths. The fixed slats are connected to the lateral frame members in the forward and rearward sections of the frame.

In a preferred embodiment, the conveyor frame includes a rear frame beam extending transversely of the trailer at the rear of the trailer. This rear frame beam includes a top. The movable slats have rear end portions which reciprocate forwardly and rearwardly over the top during operation of the conveyor. The rear end portions of the movable slats include internal blocks within the rear end portions of the movable slats, between the webs of the hook portions of the movable slats. These blocks each include a longitudinally extending downwardly opening channel space. Longitudinally extending guide members are secured to the top of the rear frame beam. These guide members are positioned to be received in the channel spaces of the blocks. As a result, the blocks will slide forwardly and rearwardly along the guide members during movement of the movable slats.

Preferably also, material flow guide members are provided on the top of the rear frame beam, behind and in longitudinal alignment with the fixed conveyor slats. Each guide member has a longitudinally extending apex and longitudinally extending side walls which slope laterally outwardly and downwardly from the apex to the top of the rear frame beam.

Other objects, features and advantages of the invention are here and after described as a part of the description of the best mode for carrying out the invention.

BRIEF DESCRIPTION OF THE SEVERAL VIEWS OF THE DRAWINGS

Like reference numerals are used to designate like parts throughout the several views of the drawings, and:

FIG. 1 is a rear end elevational view of a reciprocating slat conveyor that forms the bottom of a material compartment, such view showing the conveyor composed of laterally spaced apart fixed slats and laterally spaced apart movable slats between the fixed slats;

FIG. 2 is a view like FIG. 1, but taken in the region of a transverse drive beam, showing one third of the movable slats connected to the drive beam;

FIG. 3 is an enlarged scale end elevational view of a first embodiment of the movable slats;

FIG. 4 is a view like FIG. 3, but showing a second embodiment of the movable slats;

FIG. 7 is a large scale view of three fixed slats and two movable slats, such view being taken at about in a vertical plane at the forward end of the rear frame beam;

FIG. 8 is a view like FIG. 7, but taken looking at the rear end of FIG. 5;

FIG. 21 is an end view of a modified embodiment of the bearing, such view being an end view of an extrusion;

FIG. 22 is an end view of a movable slat between and mounted onto two adjunct fixed slats, showing the use of the bearing of FIG. 21;

FIG. 23-25 are views of three additional embodiments of the fixed slats which are in the nature of aluminum alloy extrusions; and FIGS. 26-28 are end views of fixed slats of a composite construction made up of steel members that are welded together and to a support structure for the fixed slats.

DETAILED DESCRIPTION OF THE ILLUSTRATED EMBODIMENT

U.S. Pat. No. Re 35,022, granted Aug. 22, 1995, to Raymond Keith Foster, and entitled Reduced Size Drive Frame Assembly For A Reciprocating Slat Conveyor, discloses a reciprocating slat conveyor in which the conveyor slats are connected to transverse drive beams which are in turn connected to linear hydraulic motors. The linear hydraulic motors move the drive beams and dive beams move the conveyor slats that are connected to them.

The conveyor of this invention comprises a plurality of laterally spaced apart, longitudinally extending, fixed slats 10 and a plurality of laterally spaced apart, longitudinally extended, movable slats 12, between the fixed slats 10. The fixed and movable slats 10, 12 extend substantially the full length of the conveyor. By way of typical and non-limitive example, the conveyor length may be between 32 feet and 53 feet.

Figure 11:
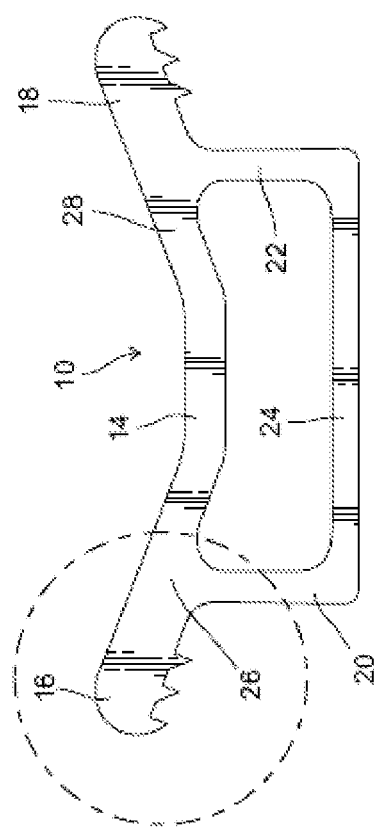
FIG. 11 is an end view of a fixed slat.

Referring to FIG. 11, the fixed slats 10 are in the form of a tubular beam, or "box" beam. Slats 10 have a top comprising a center portion 14 and two side portions 16, 18. Below the top, a pair of laterally spaced apart side walls 20, 22 extend downwardly from where the side portions 16, 18 of the top meet the center portion 14 to a bottom 24 that interconnects the lower boundaries of the side walls 20, 22. The side parts 16, 18 of the top are in the nature of a pair of wings 16, 18 that extend outwardly and slope upwardly from the locations 26, 28 where they meet the side walls 20, 22 and the central portion 14.

Figure 9:
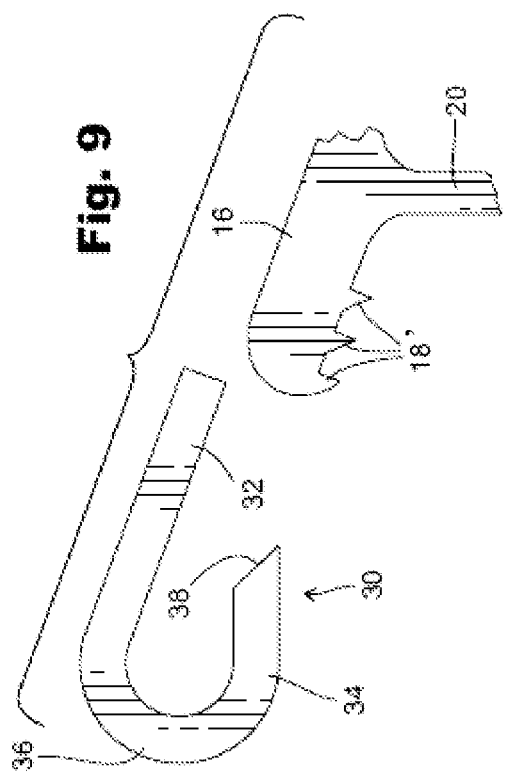
FIG. 9 is an enlarged scale fragmentary view of a side wing on a fixed slat and a slide bearing spaced outwardly from the side wing of the slat.
Figure 10:
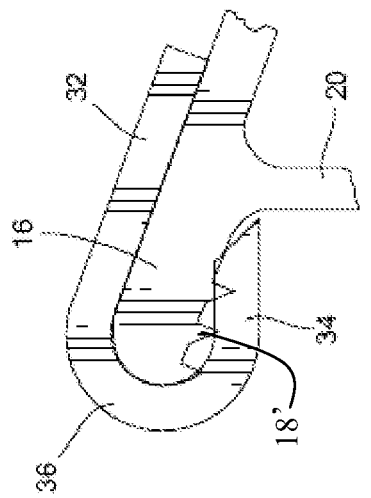
FIG. 10 is a view like FIG. 9, but showing the bearing moved onto the side wing of the fixed slat.

The wings 16, 18 are adapted to receive and hold bearings 30 that are substantially U-shaped in cross section. Referring to FIG. 9, each bearing 30 has an upper portion 32, a lower portion 34 and a bight portion 36 which interconnects the upper and lower portions 32, 34. Bearings 30 are elongated and each may include a sloping longitudinal edge surface 38. FIG. 9 shows a bearing 30 in a relaxed condition. The wings 16, 18 preferably include a plurality of teeth 18' which slope downwardly and inwardly on their outer sides and are slightly undercut on their inner sides. A bearing 30 is installed by moving the open throat of the bearing 30 between parts 32, 34 towards the outer ends of its wing 16, 18. When the sloping surface 38 meets the sloping outer surfaces of the teeth 18', the bearing 30 will be cammed onto the wing 16. When the edge 38 of bearing 30 moves inwardly beyond the inner most teeth 18' the lower part 34 of the bearing 30 will clamp itself on to the wing 16, 18. The teeth 18' will dig into the inner portion of the bearing part 34, such as shown by FIG. 10. The engagement of the tooth 18' with the bearing portion 34 will help secure the bearing 30 on the wings 16, 18.

The fixed slats 10 may be one continuous member or they may be a succession of sections positioned end-to-end on the conveyor frame. In like fashion, the bearings 30 may be a continuous member or may be shorter sections that are positioned end-to-end on the wings 16, 18. FIG. 10 shows the spring energy in the bearing acting to clamp the bearing 30 onto the side wing 16, 18, causing the teeth 18' to dig into the lower part 34 of the bearing 30.

FIG. 3 shows an enlarged scale end view of the movable conveyor slat 12 shown in FIGS. 1 and 2. FIG. 4 is an end view of a modified movable conveyor slat 12' which in most respects is like slat 12. The slats 12, 12' will now be separately described.

Referring to FIG. 3, the movable slat 12 has a top section 40 composed of side parts 42, 44 and a central part 46. As clearly shown by FIG. 3, the movable slat 12 has a laterally outwardly opening channel shaped portion on each of its sides. The side portions 42, 44 of the top 44 form upper flanges 42, 44. The pair of webs extend downwardly from the upper flanges, 42, 44 to become a pair of lower flanges 52, 54. Outwardly opening channel spaces 56, 58 are defined by and between the flanges 42, 52 and 44, 54. The inner boundaries of the channel spaces 56, 58 are closed by the webs 48, 50. Web 48 and flange 42 form a downwardly and outwardly extending hook on their side of the slat 12. Web 50 and flange 54 form a downwardly and outwardly extending hook on their side of the slat 12. The bottom surface of flange 42 and the top surface of flange 52 slope downwardly as they extend outwardly. In similar fashion, on the opposite side of the slat 12, the lower surface of flange 44 and the upper surface of flange 54 slope downwardly as they extend outwardly from the web 50. This results in the channel spaces 56, 58 sloping downwardly and outwardly. In addition to forming the hooks, the webs 48, 50 and the flanges 52, 54 strengthen the slat 12 as a structural member.

As shown by FIGS. 9 and 10, discussed above, the bearings 30 are solidly anchored on the wings 16, 18. The movable slats 12 are aligned with the channel spaces 56, 58 and the bearings 30 when the bearings are on the wings 16, 18. Then, each movable slat 12 is moved endwise to slide it onto its fixed slat 10. The lower surfaces of the upper flanges or side parts 42, 44 rest on the upper surfaces of the bearing parts 32. When a movable slat 10 is on its fixed slat 12, there is supporting contact between the lower surfaces of slat parts 42, 44 and the upper surfaces of bearing parts 32. The bight 36 of the bearing 30 is sideway contiguous the outer surface of the web 48. On the opposite side of the slat, the bight 36 is contiguous the outer surface of the web 50. The lower part 34 of the bearing 30 is contiguous the upper surfaces of the flanges 52, 54. If the slat should slide sideways, the leading web 48, 50 will contact the bight 36 of the bearing 30 of its side of the slat. If the slat 12 should move upwardly for any reason, its lower flange 52, 54 will contact the lower surfaces of the bearing parts 34.

The fitting of the bearings 36 and the wings 42, 44 within the channel spaces 56, 58 result in mutual reinforcement of the fixed and movable slats 10, 12. This is particularly important in the region of a window in the conveyor frame, described below. The fixed slats 10 are supported forwardly and rearwardly of the window in the conveyor frame. In the region of the window, the fixed slats 10 bridge over the window. Throughout their lengths, the movable slats 12 rest on and are supported by the wings 16, 18 of the fixed slats 10. Each movable slat 12 is connected to a transverse drive beam where it crosses over that transverse drive beam in the region of the window. See U.S. Pat. No. Re 35,022. The interlocking of the fixed and movable slats, where the bearings 30 and the wings 16, 18 fit within the channel spaces 56, 58, causes the conveyor slats to be sufficiently supported under essentially all conditions that arise during operation of the vehicle in which the conveyor is installed. The box beam construction of the fixed slats 10, and the trihedral construction of the movable slats 12, make the slats 10, 12 functioning structural members. It also enables them to be made with thin wall lightweight materials. For example, in preferred form, the fixed slats 10 and the movable slats 12 are extrusions made from a suitable aluminum alloy. Of course, they can be made of other metals and can be made from various plastic and composite materials as well.

Figure 18:
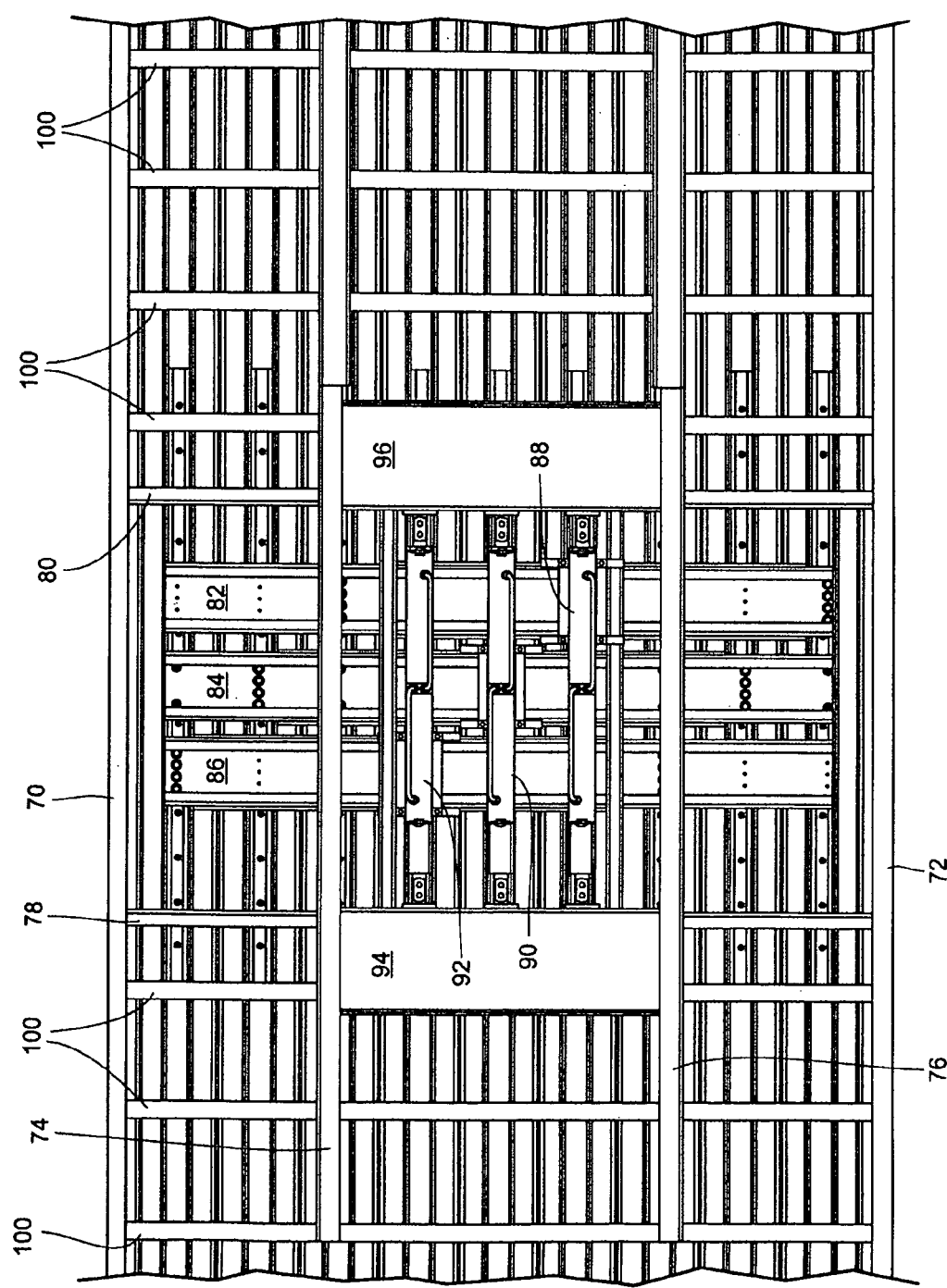
FIG. 18 is a bottom plan view of a fragmentary portion of the conveyor frame and the fixed and moving slats, such view showing a window in the conveyor frame and transverse drive beams and hydraulic drive units mounted in the window.

FIG. 18 is a bottom plan view of the conveyor frame. It comprises first and second longitudinally extending side frame members 70, 72 extending the full length of the conveyor. The frame also includes laterally spaced apart longitudinally extending inside frame members 74, 76. Frame member 74 is spaced laterally inwardly from side frame member 70. Frame member 76 is spaced laterally inwardly from side member 72. The conveyor frame further comprises longitudinally spaced apart transverse frame members 78, 80 which define between them a window in the conveyor frame in which three transverse drive beams 82, 84, 86 are situated. Drive beam 82 is connected to the moveable portion of a first drive unit 88. Drive beam 84 is connected to the movable portion of a second drive unit 90. Drive beam 86 is connected to the movable portion of a third drive unit 92. As is known, the drive units 88, 90, 92 are operated to move the drive beams 82, 84, 86 back and fourth lengthwise of the conveyor. Slats 1, 4, 7, 10 etc are connected to drive beam 82. Slats 2, 5, 8, 11, etc are connected to drive beam 84. The remaining floor slats are connected to drive beam 86. See U.S. Pat. No. 35,022 for a preferred way of making the connection. The drive units 88, 90, 92 have fixed portions that are connected to transverse frame members 94, 96 which extend laterally between the longitudinal frame beams 74, 76. See the aforementioned The window in which the drive beams 82, 84, 86 are situated is defined longitudinally between the transverse frame members 78, 80 and is defined in the transverse direction by and between the longitudinal side beams 70, 72. In the forward section of the conveyor, forwardly of the window, there are a plurality of longitudinally spaced apart transverse frame members 100. In like fashion, in the rear portion of the frame, rearwardly of the window, there are additional longitudinally spaced apart transverse frame members 100.

The transverse drive beams 82, 84, 86 are moved longitudinally of the conveyor frame and the window by the three drive units, 90, 92, 94. When the movable portions of the drive units 90, 92, 94 are moved together, the transverse drive beams 82, 84, 86 are moved together and the movable conveyor slats 12 are moved together. Any load that is on the slats 12 will be moved in the conveying direction. When the drive units 90, 92, 94 have reached the ends of their drive strokes, the drive unit connected to the trailing drive beam is retracted. This retracts a first drive beam and the conveyor slats that are connected to it. The remaining movable conveyor slats, representing two thirds of the total, are stationary. They hold the load while the retracting slats are being slid back under the load to the start position. When the first drive unit is fully retracted, the next drive unit is retracted, retracting with it a second one third of the conveyor slats 12. These retracting conveyor slats slide rearwardly under the load back to a start position. As before, the load is held against movement by the stationary slats which subject the load to twice as much area as a retracting slats. When the second drive unit is fully retracted, its conveyor slats are stopped and the third and last transverse drive beam is retracted by its drive unit. This returns the remaining one third of the movable conveyor slats back to their start position.

The fixed conveyor slats 10 are connected to the transverse frame members 78, 80, 100 in the forward and rearward sections of the conveyor frame, e.g. by welding. The portions of the fixed slats that are above the window span the window from transverse beam 78 to transverse beam 80. The movable slats 12 are supported by and travel on the fixed slats 10. In the window region the movable slats are connected to the transverse drive beams 82, 84, 86. By way of example, FIG. 2 shows that one third of the movable slats 12 are connected to their drive beam by bolts which extended downwardly through the tops of the slats into a longitudinally extending connector member on the drive beam. See U.S. Pat. No. Re 35,022.

FIG. 4 shows an end view of a modified movable conveyor slat 12'. Conveyor slat 12' is basically like conveyor slat 12, differing only in that it is provided with a pair of laterally spaced apart, upwardy projecting, longitudinal ridges 110, 112. The ridges 110, 112 have flat upper surfaces which are within a common plane that is above the upper surface of the center portion 46'. In use, loads on pallets, and similar other loads having flat bottoms, set down on the tops of the ridges 110, 112. The area of the retracting slats that must be slid under the load is the combined area of the tops of the ridges 110, 112 of the retracting slats. The presence of ridges 110, 112 also helps make the movable slats 12' less flexible, reducing any tendency that they may have to sag in the window region of the conveyor frame.

Figure 5:
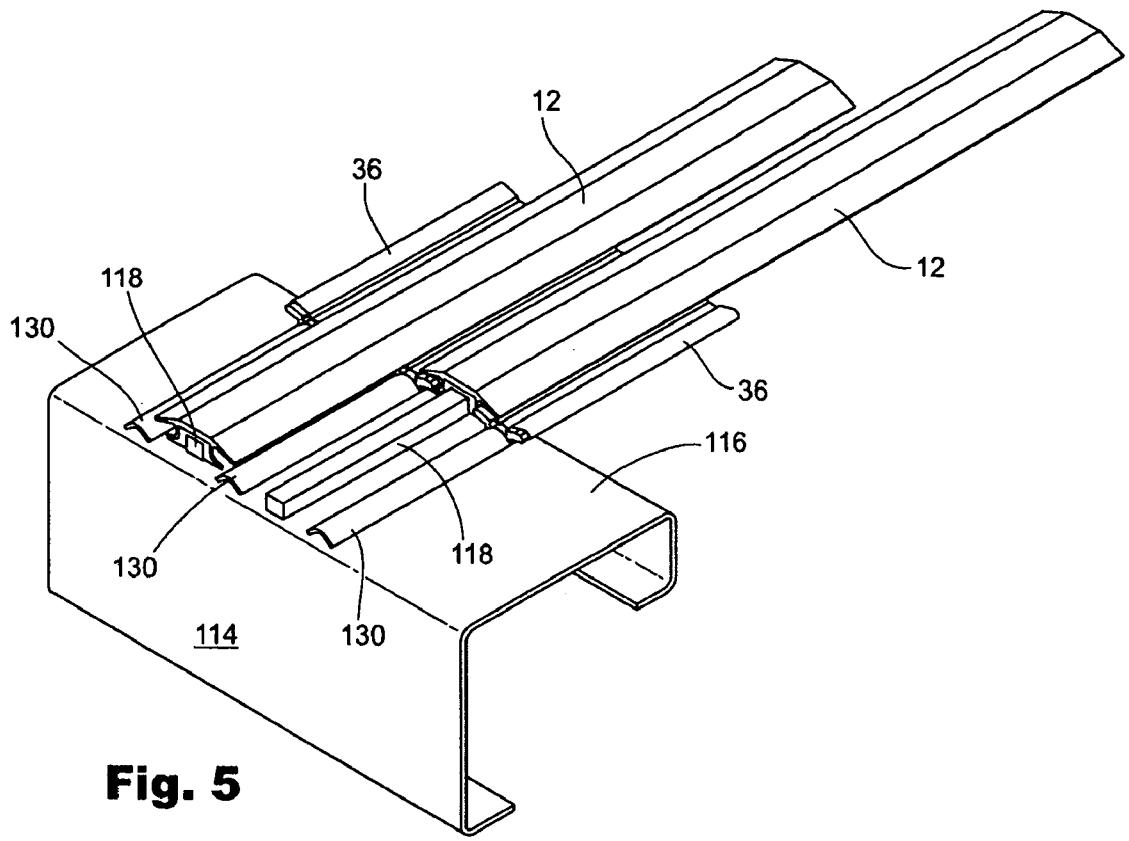
FIG. 5 is a fragmentary pictorial view taken from above and looking towards the top, rear end and one side of the conveyor, such views showing a fragmentary portion of a rear end frame beam and showing fragmentary rear end portions of the fixed and movable slats.
Figure 6:
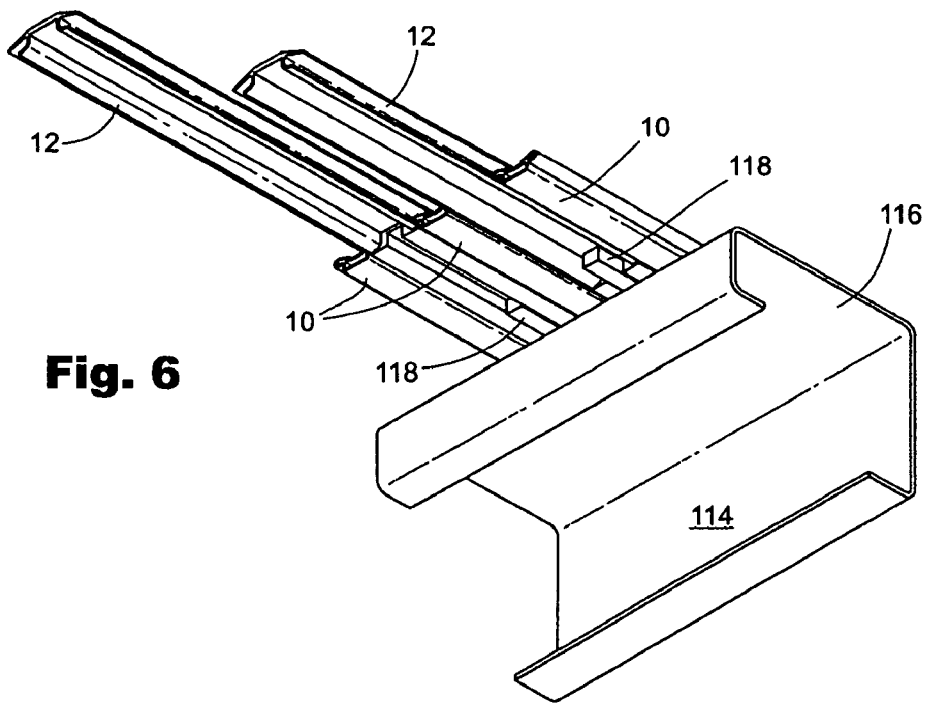
FIG. 6 is the view of the assembly shown by FIG. 5, but taken from below, and looking towards the bottom and front portion of the rear end frame beam.

Referring to FIGS. 5 and 6, the rear of the conveyor frame is in the form of a transverse frame beam 114 having a top 116. As shown by FIG. 5, the rear ends of the fixed slats 10 rest on the forward edge portion of the top 116. As also shown by FIG. 5, the front to rear dimension of the top 110 is preferably substantially equal to the stroke length of the movable slats 12. FIG. 5 shows the rear end of one slat 12 substantially at the forward end of the beam 114 and the rear end of a second slat 12 substantially at the rear end of the beam 114. The first slat 12 is in a forward position. The second slat 12 is in a rearward position.

Preferably, a guide member 118 is provided for each slat 12. Each guide member 118 extends longitudinally of the conveyor and is in line with a tunnel opening in its conveyor slat 12. By way of typical and non-limitive example, the guide members 118 may be lengths of bar stock 118, e.g. one inch by one inch. As shown by FIG. 5, the rear end of each guide beam 118 is adjacent the rear end of rear end beam 114. The forward end portion of each guide member 118 projects forwardly a short distance from the forward end of the top 116.

Figure 14:
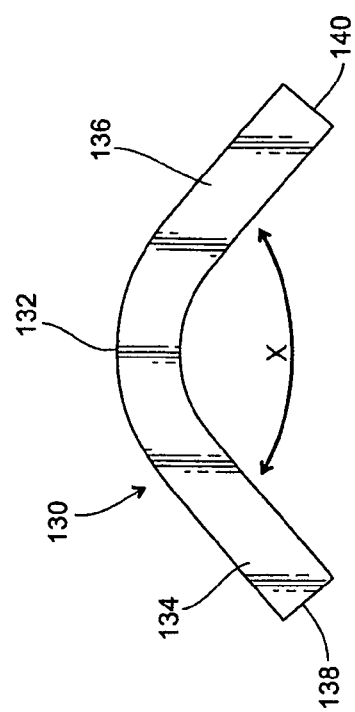
FIG. 14 is a side elevational view of the rear end bearing shown by FIG. 13, such view being broken away in its mid portion to indicate indeterminate length.
Figure 13:
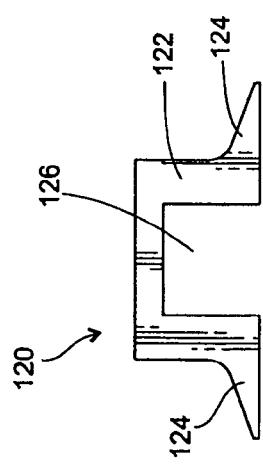
FIG. 13 is an end view of a rear end bearing for the movable slats.

As shown by FIGS. 13 and 14, a guide block 120 is provided to fit within the rear end portion of each movable slat 12. Guide block 120 has an upper portion sized to fit between the webs 48, 50 of the slats 12 and a lower portion which extends downwardly and laterally outwardly below the lower flanges 52, 54. Each block 120 includes a tunnel opening 126 sized to receive a guide member 118. As shown by FIGS. 5 and 6 together, the length of each guide member 120 is preferably slightly longer than the width of the top 116 of beam 114. FIG. 5 shows that the rearward end of the block member 120 on the fully extended slat 12 is substantially at the rear edge of the beam 114. FIG. 6 shows that the forward end of the same member 120 is at the same time a short distance forwardly of the forward end of the beam 114. Preferably, the guide blocks 120 are constructed from a self-lubricating plastic material (e.g. UHMW) so that there is a reduced friction where their surfaces contact and slide along the guide members 118.

Figure 15:
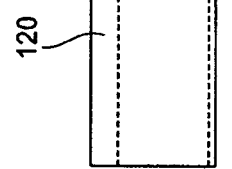
FIG. 15 is an end elevational view of an end cap for the fixed slats.

As shown by FIG. 15, the rear ends of the fixed slats 10 may be closed by an end wall 128 shaped to fit rearwardly of the bearings 36, the wings 16, 18 and the center portion 20, 22, 24. If the end walls 128 are constructed from thin metal, they may be welded to the ends of the fixed slats 10. If they are constructed from a plastic material, they may be bonded to the ends of the slats 10.

Figure 17:
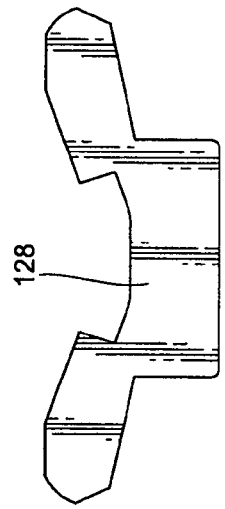
FIG. 17 is an end view of the guide member shown by FIG. 16.
Figure 16:
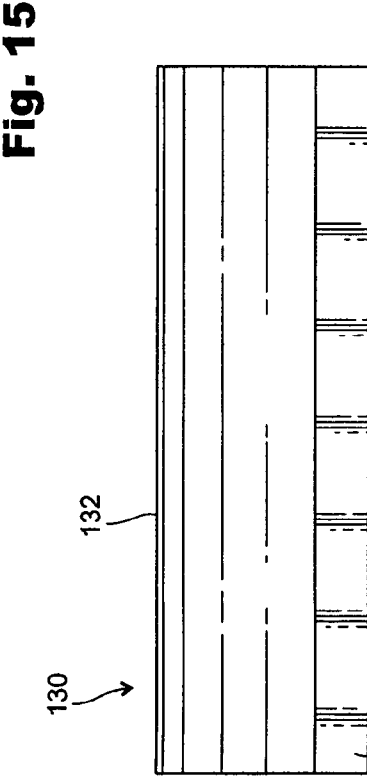
FIG. 16 is a side elevational view of a guide member positioned for guiding material discharging rearwardly from the conveyor.

Referring to FIGS. 5 and 8, a granular material guiding member 130 may be positioned on the top 116 of the rear beam 114 in axial alignment with each fixed slat 10, as shown in FIG. 8. As shown by FIG. 5, the granular material guiding members 130 are substantially equal in length to the front-to-rear dimension of top 116. These members may be made from short lengths of metal having a uniform cross sectional shape such as the angle shape shown by FIGS. 8 and 17. Angle members 130 have a longitudinal crown 132 and side parts 134, 136 which slope downwardly and outwardly from the crown 132 to lower edges 138, 140. These members 130 may be welded to the top 116 where their edges 138, 140 meet the top 116. In FIG. 16, the spread angle X of the side members 134, 136 is shown to be a little greater than ninety degrees (90°). As shown by FIG. 8, the height of the members 130, in the region of the crown 132, places the crown 132 substantially at the level of the upper surface of the fixed conveyor slat 10 where the crown 132 meets the conveyor slat 10. The base width of the member 130 places its lower edges 138, 140 substantially in alignment with the side walls 20, 22 of the fixed slat 10.

As can be appreciated, when the movable slats 12 are being moved rearwardly, with a load on them, the region between adjacent slats 12 above the members 130 will be moved into positions above the crowns 132. When the slats 12 are retracted to a forward position, bulk material on the upper surfaces of the side parts 42, 44 of the slats 12 will slide sideways onto the members 132 and will then slide to one side or another of the members 32, generally into the paths of the rear ends of the movable slats. Then, during the next conveying stroke, when the movable slats 12 are advanced to the rear of the conveyor, the rear ends of the slats 12 will push the bulk material rearwardly along and then off from the top 116.

Figure 12:
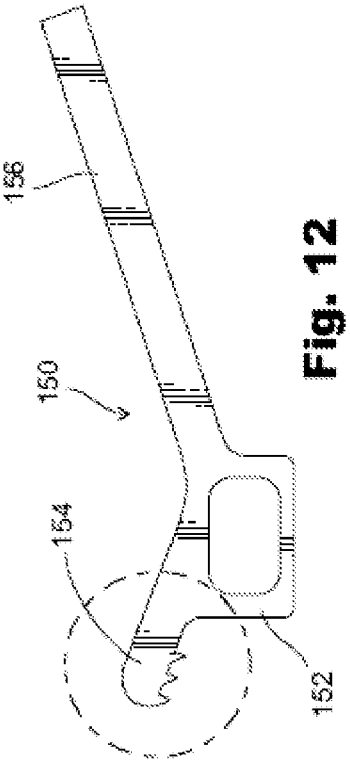
FIG. 12 is a view like FIG. 11, but of an outer side fixed slat.

FIG. 2 shows that on the two sides of the conveyor the fixed slats 150 may have a different cross sectional shape than the other fixed slats 10. This shape is shown by FIG. 12. Fixed slat 150 has a longitudinally extending box beam section 152, a single wing 154, and a sloping guide panel 156. The box beam section is anchored to the conveyor frame, placing the wing 154 in position to function the same as a wing 16. Wing 154 is provided with a bearing 30 that fits on the wing 16, in the manner shown by FIG. 10. This wing 154 and its bearing 30 then fit within the channel space 58 on the outermost movable slat 12 on its side of the conveyor. The sloping guide surface 156 slope upwardly and outwardly from box beam 122 to a side wall portion of the installation where it is preferably connected to the side wall portion of the installation.

Preferably, the fixed and movable slats 10, 12 are extrusions made from a structural aluminum alloy. However, in some installations, the slats 10, 12 can be constructed from other metals (e.g. steel) or from plastic or composite materials.

Figure 19:
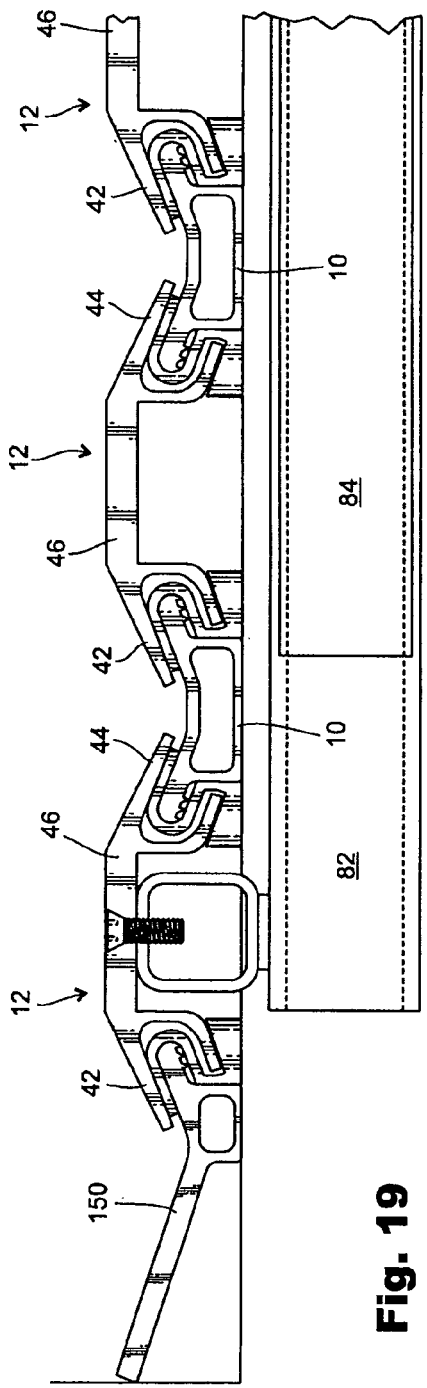
FIG. 19 is an enlarged scale fragmentary view of the left end portion of FIG. 2, showing the connection of one of the movable slats to a connector member on its drive beam.
Figure 20:
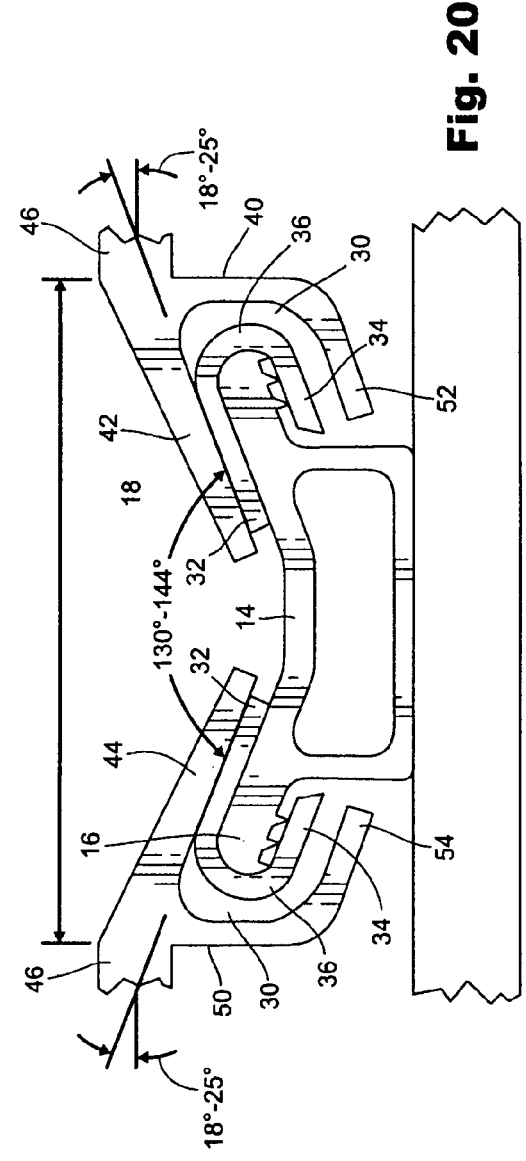
FIG. 20 is an enlarged scale view of one of the fixed slats and the side portions of the movable slats on the opposite sides of the fixed slat.

Referring to FIGS. 19 and 20, the movable slats 12 have a substantially horizontal center portion 46 which is located between sloping side portions 42, 44. As best shown by FIG. 20, the lower surfaces of the side portions 42, 44 sit down on the upper surfaces of the top parts 32 of the bearings 30. The top surfaces of the bearing parts 32 and the lower surfaces of the slat parts 32, 44 are substantially planar surfaces, each of which slopes upwardly and outwardly from its lower end. As shown in FIG. 20, the slope angle of the surfaces is preferably between 18 degrees and 25 degrees. As a result, the V-angle between the two upper surfaces of the bearings 32 and between the two lower surfaces of the slat parts 42, 44 is about 130 degrees-144 degrees. The conveyor shown by FIGS. 1 and 2 is eighteen movable slats wide it includes nineteen fixed slats. A fixed slat 150 is on each side of the conveyor and seventeen fixed slats 10 are between adjacent movable slats 12. This arrangement provides nineteen trough spaces in which liquid can be collected. This liquid may be drainage from garbage carried by the conveyor. In this conveyor, the liquid is collected in the shallow V-region over the fixed slats 10, 150 and between the movable slats 12. In this conveyor, the bearings 30 also function as seals. The weight of the load acting downwardly on the moveable slats 12 presses the side parts 42, 44 against the upper surfaces of the bearing parts 32. As can be seen by FIG. 20, this surface contact is relatively wide and it slopes upwardly from the lower ends of the bearing parts 32 to the upper ends of the bearing parts 32 where they meet bight 36. Moisture and or fines collected in the trough must move outwardly and upwardly between the contacting surfaces before the moisture or fines can move into spaces below the movable slats. The weight of the load acting on the moveable slats 12, presses the side parts 42, 44 downwardly against the upper parts 32 of the bearings 30 and this contact essentially closes any passageway which might otherwise exsist between the side parts 42, 44 of the movable slats 12 and the upper parts 32 of the bearings 30. Another feature of the movable slats 12 is that the central region 46 has a substantially flat top 40. This flat region provides a larger amount of friction between the movable slats and the load in comparison with the V-slats that have rounded crowns at the centers, such as shown by the aforementioned U.S. Pat. No. 5,044,870.

The movable slats 12' shown by FIG. 4 are constructed to withstand high impact loads, e.g. a load imposed by heavy articles dropped onto a slat 12'. FIG. 21 shows a bearing which may be used with the impact floor. FIG. 22 shows the bearing assembled with the fixed slats and the movable high impact slats 12'. A downward force imposed on the slat 12' will move the side parts 42', 44' of the slat 12' against the upper part 32 of the bearing 30. Some of this impact load may be transmitted by the flanges 52, 54 to the lower region 31 of the bearing 30'. This lower region 31 of the bearing 30' sits down on the support surface(s) for the fixed slats 10.

FIGS. 23-28 show modified constructions of the fixed slats. The Fixed slats shown by FIGS. 22-24 are aluminum alloy extrusions. The fixed slats shown by FIG. 23 are longitudinal sections of a leakproof subdeck which includes a sealed connection between the adjacent side edges of the subdeck sections.

The fixed slats shown by FIGS. 24 and 25 have support legs that can either be bolted down or welded to the support structure provided for such slats. The fixed slats shown by FIGS. 26-28 are made of steal members that are welded together and to the substructure below the fixed slat. In FIGS. 24-28, the wings are designated W.

The illustrated embodiments are only examples of the present invention and, therefore, are non-limitive. It is to be understood that many changes in the particular structure, materials and features of the invention may be made without departing from the spirit and scope of the invention. Therefore, it is our intention that our patent rights be limited by the particular embodiments illustrated and described herein, but rather are to be determined by the claims which follow, interpreted in accordance with the established rules of patent claim interpretation.

What is claimed is:

1. A reciprocating slat conveyor comprising:
  a conveyor frame including a pair of laterally spaced apart, longitudinally extending, side beams, a forward frame section comprising forward portions of the side beams and longitudinally spaced apart lateral frame members extending between the side frame beams, a rearward frame section comprising rearward portions of the side beams and longitudinally spaced apart lateral frame beams extending between the side beams, and a window longitudinally between the forward frame section and the rearward frame section, said window providing a space laterally between intermediate portions of the side beams and longitudinally between two longitudinally spaced apart lateral frame members;
  a plurality of drive units in the window, each having a fixed portion anchored to the frame and movable portions moveable in the window;
  a plurality of transverse drive beams in the window, each connected to the movable portion of a different one of the drive units;
  a plurality of laterally spaced apart, longitudinally extending, fixed slats connected to the forward and rear sections of the frame and bridging longitudinally over the window and over the transverse drive beams in the window;
  a plurality of laterally spaced apart, longitudinally extending, movable conveyor slats between the fixed slats, said movable slats being divided into sets equal in number to the number of transverse drive beams, and each set of movable slats being connected to a separate one of the transverse drive beams;
  said fixed slats each having a longitudinally extending center portion and a pair of side wings extending laterally outwardly and upwardly from the center portion;
  said movable slats each having a longitudinally extending center portion, a pair of longitudinally extending side portions, and a pair of laterally spaced apart, longitudinally extending hook portions including a web connected to the movable slat where the center portion meets a side portion, said hook portions each extending first downwardly in the form of a web and then laterally outwardly in the form of a lower flange that is integral with the web, said slat side portions, said webs and said lower flanges together forming laterally outwardly opening channel spaces;
  fixed bearings on the side wings each having an upper part sitting down on its side wing and a lower part below its side wing, wherein said bearings being mounted on said wings, and said wings and bearings being located in the channel spaces, vertically between the side portions of the slat and the lower flanges; and
  said side portions of the movable slats having bottom surfaces which rest on the upper parts of the bearings, and said lower flanges being below the lower parts of the bearings.

2. The reciprocating slat conveyor of claim 1, wherein the fixed and movable slats are extrusions, each having a uniform cross sectional shape throughout its length.

3. The reciprocating slat conveyor of claim 1, wherein in the forward and rearward frame sections, the center portions of the fixed slats are connected to the lateral frame members.

4. The reciprocating slat conveyor of claim 1, wherein said conveyor frame includes a rear frame beam extending transversely of a trailer, said rear frame beam including a top, and wherein the movable slats have rear end portions which reciprocate forwardly and rearwardly over the top during operation of the conveyor, and wherein said rear end portions of the movable slats include blocks within the rear end portions of the movable slats, between the webs of the hook portions of the movable slats; said blocks each including a longitudinally extending, downwardly opening channel space; and longitudinally extending guide members secured to the top of the rear frame beam, said guide members being positioned to be received in the channel spaces of the blocks, wherein the blocks will slide forwardly and rearwardly along the guide members during movement of the movable slats.

5. The reciprocating slat conveyor of claim 4, further comprising a rear frame beam having a top, material guide members on the top of the rear frame beam, in longitudinal alignment with the fixed conveyor slats, said longitudinally extending guide members each having a longitudinally extending apex and longitudinally extending side walls sloping laterally outwardly and downwardly from the apex.

6. The reciprocating slat conveyor of claim 1, further comprise longitudinally extending guide members on the top of the rear frame beam, in longitudinal alignment with the fixed conveyor slats, said members having a longitudinally extending apex and side walls sloping laterally and outwardly downwardly from the apex.

7. The reciprocating slat conveyor of claim 1, further comprising a transverse rear frame beam having a top, wherein said movable slats reciprocate back and forth across the top; and further comprising longitudinally extending guide members secured to the top of the rear frame beam in substantial alignment with the movable slats; and said movable slats including guide bearings and rear end portions of the movable slats which are positioned to receive the guide members.

8. The reciprocating slat conveyor of claim 7, wherein the fixed slats have rear end portions that terminate on a forward portion of the top of the transverse rear frame beam, and longitudinally extending guide members on the top of the rear frame beam, in longitudinal alignment with the fixed conveyor slats, said guide members having a longitudinally extending apex and longitudinally extending side walls sloping laterally outwardly and downwardly from the apex.

9. The reciprocating slat conveyor of claim 1, wherein the center portions of the fixed slats are tubular box beams having a width dimension greater than twice the height dimension where the side wings are attached to the center portion.

10. The reciprocating slat conveyor of claim 9, wherein the forward and rearward frame sections, and wherein the center portions of the fixed slats are connected to the lateral frame members.

* * * * *